July 27, 1965 J. E. SMITH, JR 3,197,750

MAGNETIC TRANSDUCER HEAD MOUNTING MEANS

Filed April 28, 1961 4 Sheets-Sheet 1

INVENTOR.
JOSEPH E. SMITH JR.
BY
Bower & Patalidis
ATTORNEYS

July 27, 1965 J. E. SMITH, JR 3,197,750

MAGNETIC TRANSDUCER HEAD MOUNTING MEANS

Filed April 28, 1961 4 Sheets-Sheet 2

INVENTOR.
JOSEPH E. SMITH JR.
BY
Bower & Patalidis
ATTORNEYS

July 27, 1965 J. E. SMITH, JR 3,197,750

MAGNETIC TRANSDUCER HEAD MOUNTING MEANS

Filed April 28, 1961 4 Sheets-Sheet 3

INVENTOR.
JOSEPH E. SMITH JR.
BY
Bower & Patalidis
ATTORNEYS

INVENTOR.
JOSEPH E. SMITH JR.
BY
Bower i Patalidis
ATTORNEYS

United States Patent Office 3,197,750
Patented July 27, 1965

3,197,750
MAGNETIC TRANSDUCER HEAD MOUNTING MEANS

Joseph E. Smith, Jr., Birmingham, Mich., assignor to Ex-Cell-O Corporation, Detroit, Mich.
Filed Apr. 28, 1961, Ser. No. 106,216
12 Claims. (Cl. 340—174.1)

The invention relates to magnetic recording on movable magnetizable surfaces in general, and more perticularly to novel methods and apparatus for accurately and rapidly positioning the magnetic flux producing elements of transducer heads closely adjacent to, but out of contact with, movable magnetizable surfaces.

In the magnetic recording on rotating drums, discs and the like, it is the preferred practice to prevent actual physical contact between the transducer head and the magnetizable surface in order to avoid wear and damage to both components. However, it is desirable to position the head in such a way as to establish a very slight clearance between the head pole pieces and the magnetizable surface, in order to obtain high quality recording and playback, together with a high packing of "bit" density per inch of track.

Feeler gauges are commonly employed to arrive at an accurate head-to-surface spacing. The use of feeler gauges is a tedious and slow operation, complicated by the fact that the magnetizable surface is not always accessible, surrounded as is often the case by a suitable shroud or housing. Furthermore, the air gap spacing must generally be the same for all the heads in a given apparatus and it is obvious that much time would be saved if it were possible to set the gap for a plurality of heads in one operation, with accuracy and precision. It is, therefore, an object of the invention to provide methods and apparatus for accurate spacing of magnetic heads to a magnetizable surface without actual physical access to the latter.

It is a further object of the invention to provide for a method of setting magnetic transducer heads which requires a minimum amount of mechanical measurements.

It is another object of the invention to provide methods and apparatus for setting a plurality of magnetic transducer heads in one operation.

Another object of the invention is to provide methods and apparatus enabling the setting of magnetic heads by operators untrained in the use of delicate measuring instruments.
uring instruments.

Still another object of the invention is to provide methods and apparatus for setting magnetic heads wherein simple and robust components are used.

A further object of the invention is to render the setting of a great number of magnetic heads a fast and accurate operation.

Further objects and advantages will become apparent from the following detailed description, considered in connection with the accompanying drawings, and from the appended claims.

Referring now to the drawings, wherein like components in the several views are identified by like reference numerals:

Figures 1, 2, 3:
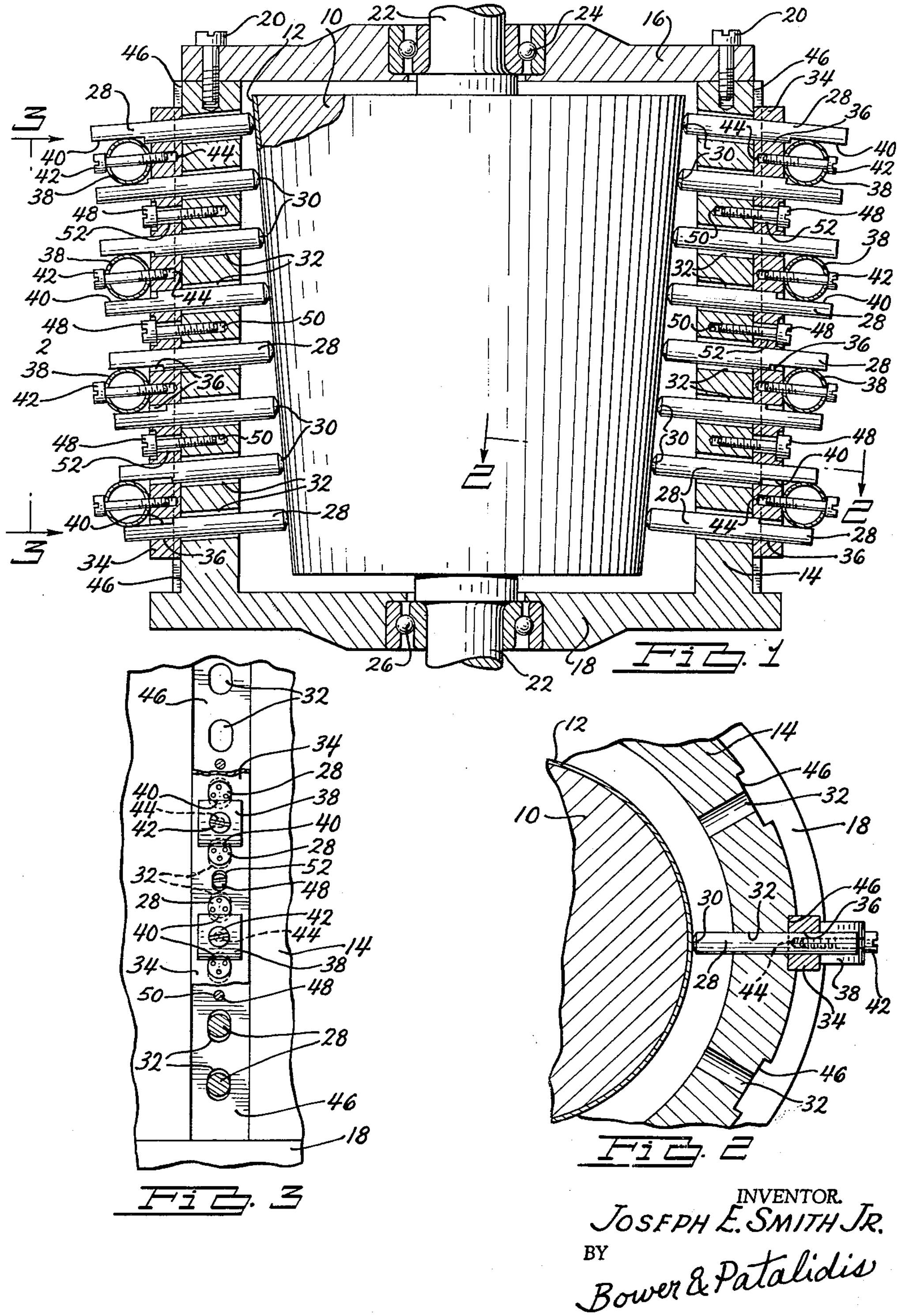
FIGURE 1 is a longitudinal sectional view of a magnetic recording apparatus according to the principles of the invention.
FIGURE 2 is a framentary substantially cross sectional view along line 2—2 of FIGURE 1, looking in the direction of the arrows.
FIGURE 3 is a fragmentary elevation view from line 3—3 of FIGURE 1, with some elements broken away for more clarity.

Referring now more particularly to the preferred example of FIGURES 1–3, the apparatus comprises a drum 10 with a magnetizable surface 12 on the outer periphery thereof. Drum 10 is tapered, or, in other words, shaped as a frustum of a right circular cone with its diameter decreasing from top to bottom, as viewed in FIGURE 1. Drum 10 is surrounded by a stationary housing or shroud 14, having a substantially cylindrical outer surface and provided with closure end plates 16 and 18. End plate 16 is shown as being fastened upon one end of housing 14 by means of the screws or bolts 20 and end plate 18 is shown to be integral with housing 14. It is obvious that this order could be inverted, or end plate 18 could also be bolted on housing 14 instead of being integral as shown.

A shaft 22 is fastened to the drum 10 and is journalled by means of the bearing 24–26 for rotation in relation to the stationary housing 14. Housing 14 supports a plurality of transducer heads 28 having their flux emitting tips 30 in close proximity with the magnetizable surface on the drum 10. The transducer heads 28 are preferably cylindrically shaped and are secured through slightly elongated openings 32 in the housing 14 by means of the mounting bars 34.

Each such mounting bar 34 is a parallepipedic elongated block or bar provided with openings 36 adapted to snugly accept the bodies of the transducer heads. The transducer heads are locked in position by means of a holding and locking device, including a short tubular clip 38 disposed between two adjacent transducer heads in contact with the flat reference orienting surfaces 40—40 on the bodies of the transducer heads. A screw 42, introduced through aligned holes in the body of the tubular clip, is threaded into a tapped hole 44 in the mounting bar and, when tightened, compresses the tubular clip, thereby securely locking the two adjacent transducer heads. Such a holding and locking device is described in detail in the Mitchell Patent No. 2,965,886. Other devices could be used to hold and lock two adjacent heads in the holding bar 34, such as are disclosed in the copending applications of Hugh M. Taft, Serial No. 684,278, which has now issued as U.S. Letters Patent No. 3,001,181, and of Joseph E. Smith, Jr., Serial No. 772,862, now abandoned, both assigned to the assignee of this invention.

On the outer surface of the housing 14, channels 46 are disposed longitudinally to receive the mounting bars 34, which are adjustably secured by means of the mounting screws or bolts 48 threaded into the holes 50 in the housing by passing through the elongated apertures 52 in the mounting bars.

To establish the air gap between the transducer heads and the magnetizeable surface on the drum, the transducer heads are first set with their magnetic flux emitting ends 30 in contact with the magnetizable surface 12 on the drum 10. Each transducer head is securely clamped in position in hole 36 of the mounting bar 34 by tightening of the locking screw 42. The screws 48 are then backed up slightly, allowing bar 34 to become longitudinally slidable within the recess of channel 46. Moving the bar in the direction of the smaller end of tapered drum 10 establishes a spacing between the flux emitting ends 30 of the transducer heads and the magnetizable surface 12; the spacing is a function of the drum taper and of the amount of linear displacement of bar 34. Assuming, for example, a taper of one percent, a longitudinal linear displacement of the transducer mounting bar of .100" would result in establishing an air gap of .0005". Once the desired air gap is established, the screws 48 are tightened in order to securely maintain the holding bar 34 in the appropriate position.

The air gap thus established is obtained in one operation for all the transducer heads in each mounting bar. The amount of linear displacement of the mounting bar can be easily determined by using appropriate gauges, or more simply yet by mere line markings on the bars and the housing proximate the channels.

Figure 7:
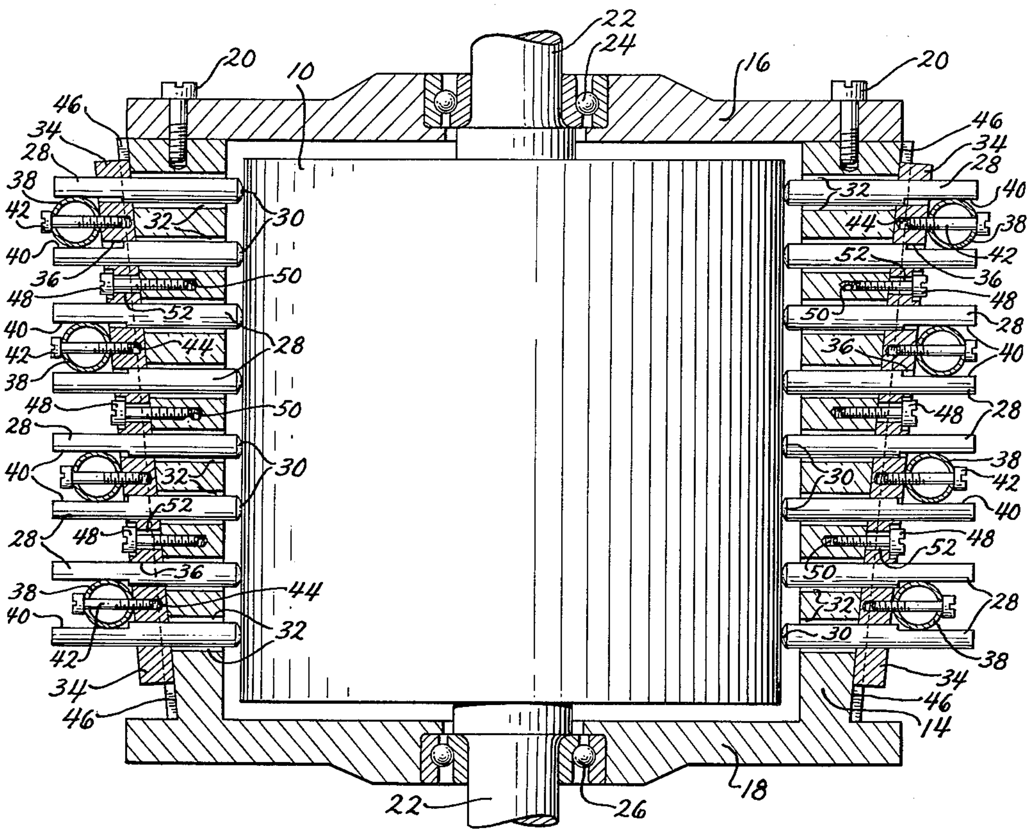
FIGURE 7 is a longitudinal sectional view of another modification of the invention.

Referring now to FIGURE 7, it can be seen how the principle of the invention can be applied to a combination of a cylindrical drum 10 and a housing 14 having a tapered outer surface. The remaining components of the apparatus are similar to those described in connection with FIGURES 1–3, and they are identified by like reference numerals.

The air gap is set also in the same fashion as in the example of FIGURES 1–3; the transducer heads are first locked in the mounting bar with their ends 30 in contact with the surface of the drum. The screws 48 holding the bar in the channel on the housing are then loosened and the bar is slid linearly in the direction of greater diameter of the housing. After the correct gap has been established, the screws 48 are tightened.

Figure 4:
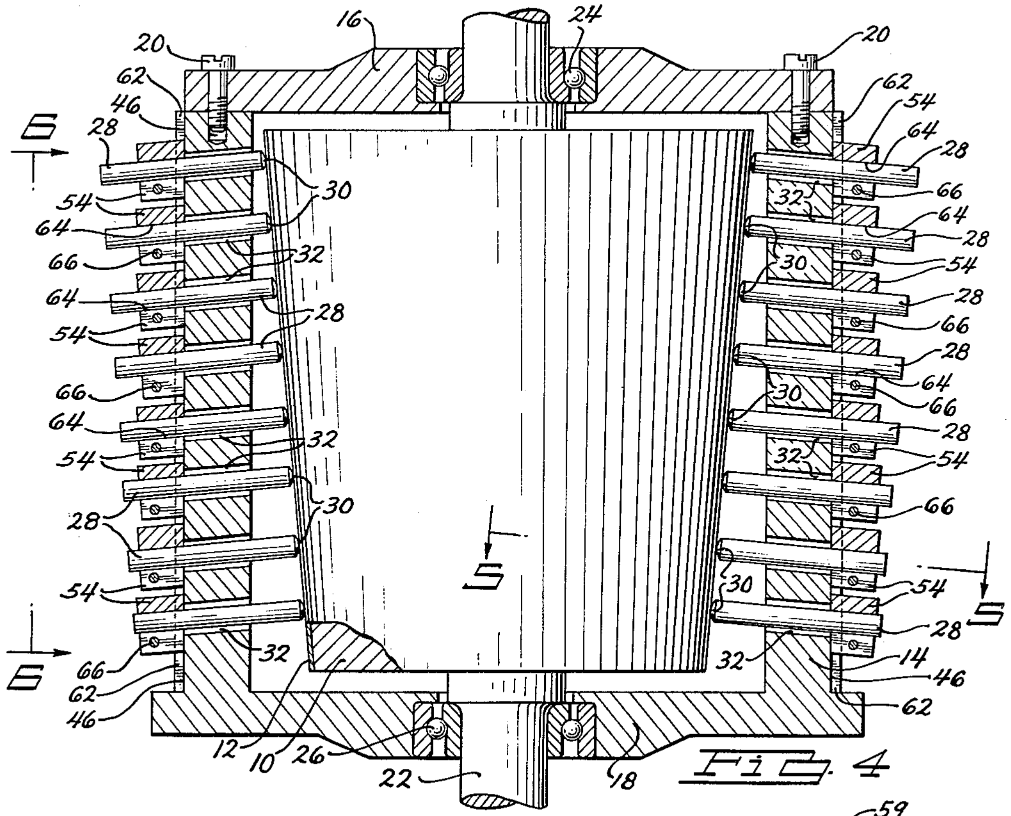
FIGURE 4 is a longitudinal sectional view of a modification of the invention.
Figure 6:
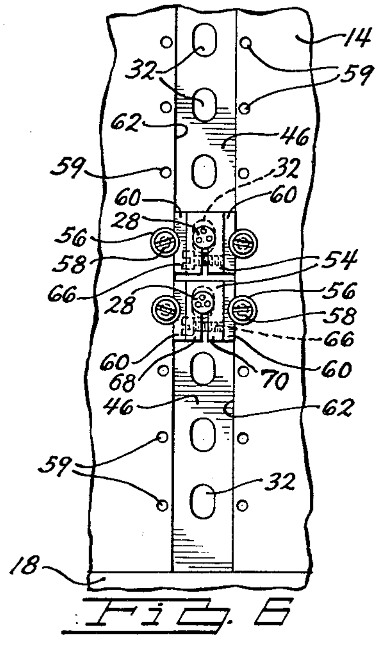
FIGURE 6 is a fragmentary elevation view from line 6—6 of FIGURE 4, with some elements broken away for more clarity.
Figure 5:
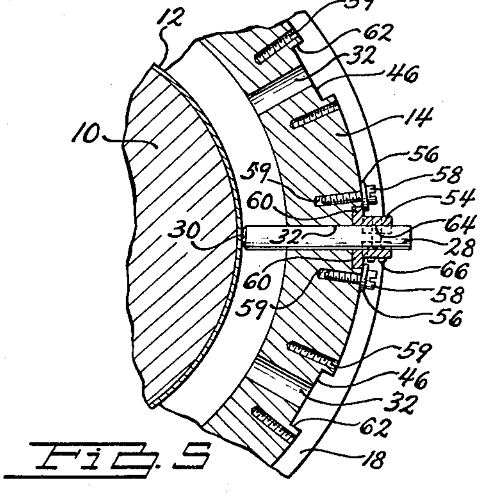
FIGURE 5 is a fragmentary cross sectional view along line 5—5 of FIGURE 4, looking in the direction of the arrows.

FIGURES 4–6 illustrate a modification of the transducer head mounting device for use in a combination of a tapered drum with a cylindrical housing, but where it is desired to have the heads fastened individually on the housing.

A cylindrical housing or shroud 14 supports, in the usual manner, the tapered drum 10 provided with a shaft 22 journalled by bearings 24–26 in end plates 16–18. The longitudinal channels 46 are machined on the outer surface of the housing and are adapted to slidably receive the transducer heads mounting blocks 54. Each mounting block 54 is fastened in the channel by means of the washers 56 secured by the screws 58 and bearing upon the surface of flanges 60—60 integral with block 54. The thickness of flanges 60—60 is slightly greater than the height of the edges 62—62 of the channel and tightening of the screws 58 in the threaded holes 59 in housing 16 securely immobilizes the blocks 54 within the channels 46.

Each block 54 has an opening 64 substantially perpendicular to the surface of the drum 10 into which is introduced a transducer head 28. The transducer head body penetrates through the housing 14 by projecting through the elongated hole 32 therein. The mounting block 54 is bifurcated by having a slot cut all the way to hole 64, and a screw or bolt 66 is used to draw the fork members 68–70 together in order to clamp the transducer head body securely in place in mounting block 54. Such a device is described in detail in the copending application of James P. Casey et al., Serial No. 70,043, assigned to the assignee of this invention.

To establish the air gap between a transducer head and the magnetizable surface on the drum, the transducer head is first set with its magnetic flux emitting end 30 in contact with the magnetizable surface 12 on the drum 10. The head is securely clamped in position in the hole 64 of the mounting block 54 by tightening the locking screw 66. Screws 58—58 are then backed up slightly, permitting the block 54 to become longitudinally slidable along channel 46. Moving the block in the direction of the smaller end of tapered drum 10 establishes a spacing between the magnetic flux emitting end 30 of the transducer head and the magnetizable surface 12. The spacing is a function of the drum taper and of the amount of linear displacement of block 54, as explained hereinbefore in relation to FIGURES 1–3. Once the desired air gap is established, screws 58—58 are tightened in order to securely maintain the mounting block 54 in the appropriate position.

Figure 8:
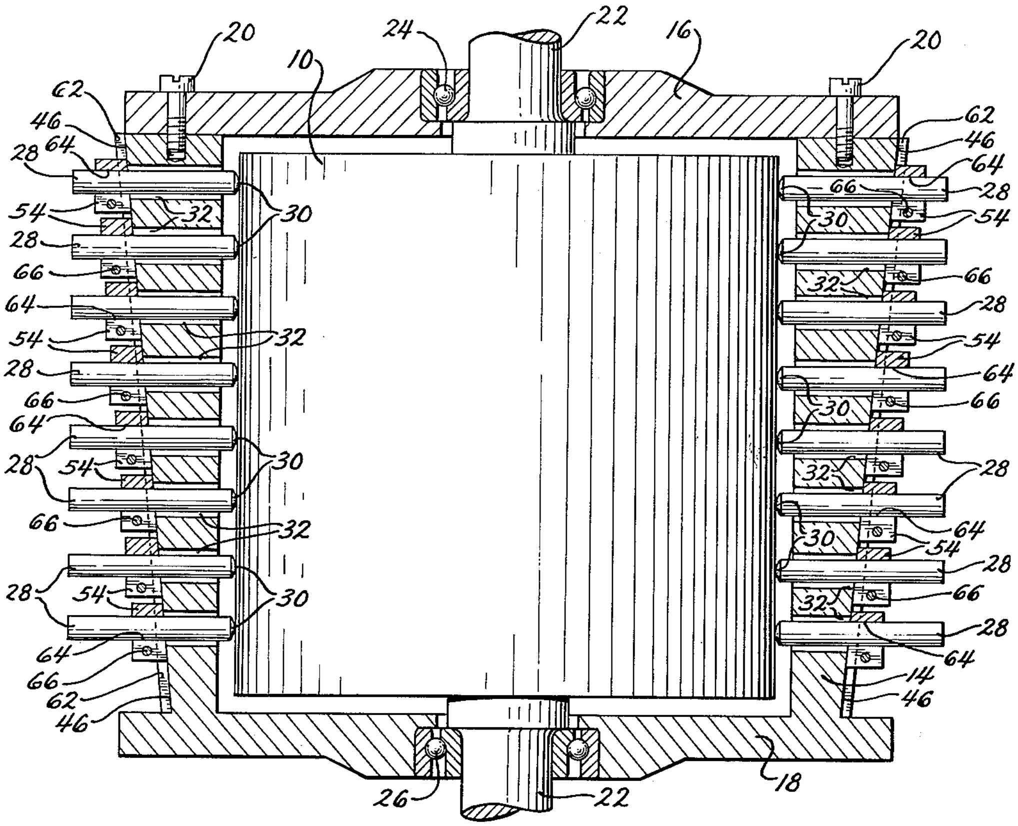
FIGURE 8 is a longitudinal sectional view of still another modification of the invention.

FIGURE 8 shows how the principle of the invention is applied to a combination of a cylindrical drum 10 and a tapered housing 14. In order to set the air gap, the transducer head is clamped in its mounting block 54 with its end 30 in contact with the surface of the drum. The screws (not shown) holding the block 54 in the channel 46 on the housing are then loosened and the block is slid in the direction of greater outer diameter of the housing. Once the correct air gap has been established, the screws holding the block 54 in the channel 46 are tightened, thereby locking the transducer head mounting block securely in the appropriate position.

It is obvious that when mounting blocks are used, as shown in FIGURES 4–6 and FIGURE 8, the air gap between the transducer head pole piece and the surface of the drum is set for each head individually instead of being set for a certain number of heads in one operation, as is obtained by using the transducer head mounting bar of FIGURES 1–3 and FIGURE 7. There are some applications where such an individual head setting is deemed preferable as would be the case, for example, where substantially identical signal strengths are sought to be obtained from magnetic transducer heads having characteristics varying from one to the other.

It is, of course, to be understood that the description and the accompanying drawings herein contained are merely illustative, and that various modifications, changes and omissions may be made in the structure disclosed without departing from the spirit and scope of the invention.

What is claimed is:

1. Apparatus for mounting rows of elongated magnetic transducer heads with their magnetic flux emitting ends a predetermined distance away from a magnetizable surface, said apparatus comprising: a tapered rotatable drum member supporting the magnetizable surface; a stationary main support member defining a substantially cylindrical reference surface arranged outwardly and concentrically to said rotatable drum member; a channel for each row of said transducer heads, the channel being disposed longitudinally on the cylindrical reference surface and having along its axis thereon a series of elongated apertures adapted to allow the bodies of said transducer heads to protrude to the interior of said stationary main support member; a tranducer head mounting bar slidably situate in said channel and capable of limited longitudinal linear movement; means adjustably securing said transducer heads in said mounting bar; and means adjustably securing said mounting bar in said channel.

2. Apparatus for mounting rows of elongated magnetic transducer heads with their magnetic flux emitting ends a predetermined distance away from a magnetizable surface, said apparatus comprising: a tapered rotatable drum member supporting the magnetizable surface; a stationary main support member defining a substantially cylindrical reference surface arranged outwardly and concentrically to said rotatable drum member; a channel for each row of said transducer heads, said channel being disposed longitudinally on said cylindrical reference surface and having along its axis thereon a series of elongated apertures adapted to allow the bodies of said transducer heads to protrude to the interior of said stationary main support member; a row of transducer head mounting blocks slidably situate in said channel, each one of said blocks being capable of limited longitudinal linear movement; means adjustably securing each one of said transducer heads in each one of said mounting blocks; and means individually and adjustably securing said mounting blocks in said channel.

3. Apparatus for mounting rows of elongated magnetic transducer heads with their magnetic flux emitting ends a predetermined distance away from a magnetizable surface, said apparatus comprising: a cylindrical rotatable drum member supporting the magnetizable surface; a stationary main support member defining a substantially tapered reference surface arranged outwardly and concentrically to said rotatable drum member; a channel for each row of said transducer heads, said channel being disposed longitudinally on said tapered reference surface and having along its axis thereon a series of elongated apertures adapted to allow bodies of the said transducer heads to protrude to the interior of said stationary main support member; a transducer head mounting bar slidably situate in said channel and capable of limited longitudinal linear movement; means adjustably securing said transducer heads in said mounting bar; and means adjustably securing said mounting bar in said channel.

4. Apparatus for mounting rows of elongated magnetic transducer heads with their magnetic flux emitting ends a predetermined distance away from a magnetizable surface, said apparatus comprising: a cylindrical rotatable drum member supporting the magnetizable surface; a stationary main support member defining a substantially tapered reference surface arranged outwardly and concentrically to said rotatable drum member; a channel for each row of said transducer heads, said channel being disposed longitudinally on said tapered reference surface and having along its axis thereon a series of elongated apertures adapted to allow the bodies of said transducer heads to protrude to the interior of said stationary main support member; a row of transducer head mounting blocks slidably situate in said channel, each one of said blocks being capable of limited longitudinal linear movement; means adjustably securing each one of said transducer heads in each one of said mounting blocks; and means individually and adjustably securing said mounting blocks in said channel.

5. Apparatus for mounting at least one transducer head with its flux emitting tip a predetermined distance away from a magnetizable surface, said apparatus comprising: a tapered rotatable drum member supporting the magnetizable surface; a stationary main support member defining a substantially cylindrical reference surface arranged outwardly and concentrically to said rotatable drum member; at least one channel disposed axially on said cylindrical reference surface; a transducer head mounting bar slidably situate in said channel and capable of limited axial linear movement therein; means adjustably securing the transducer head in said mounting bar; and means adjustably securing said mounting bar in said channel.

6. Apparatus for mounting a transducer head with its flux emitting tip a predetermined distance away from a magnetizable surface, said apparatus comprising: a tapered rotatable drum member supporting the magnetizable surface; a stationary main support member defining a substantially cylindrical reference surface arranged outwardly and concentrically to said rotatable drum member; at least one shallow channel disposed axially on said cylindrical reference surface; at least one transducer head mounting block slidably situate in said channel and capable of axial linear movement therein; means adjustably securing the transducer head in said mounting block; and means adjustably securing said mounting block in said channel.

7. Apparatus for mounting at least one transducer head with its flux emitting tip a predetermined distance away from a magnetizable surface, said apparatus comprising: a cylindrical rotatable drum member supporting the magnetizable surface; a stationary main support member defining a substantially frusto-conical reference surface arranged outwardly and concentrically to said rotatable drum member; at least one channel disposed axially on said frusto-conical reference surface; a transducer head mounting bar slidably situate in said channel and capable of limited axial linear movement therein; means adjustably securing the transducer head in said mounting bar; and means adjustably securing said mounting bar in said channel.

8. Apparatus for mounting a transducer head with its flux emitting tip a predetermined distance away from a magnetizable surface, said apparatus comprising: a cylindrical rotatable drum member supporting the magnetizable surface; a stationary main support member defining a substantially frusto-conical reference surface arranged outwardly and concentrically to said rotatable drum member; at least one shallow channel disposed axially on said frusto-conical reference surface; at least one transducer head mounting block slidably situate in said channel and capable of axial linear movement therein; means adjustably securing the transducer head in said mounting block; and means adjustably securing said mounting block in said channel.

9. A method of establishing an air space gap between a transducer head magnetic flux emitting tip and a magnetizable record surface which is characterized by: supporting the magnetizable record surface on a drum member shaped as a frustum of a right circular cone; mounting said drum member rotatably within a coaxial stationary housing structure having a cylindrical outer surface; setting the transducer head in a holding member linearly slidable longitudinally upon said cylindrical outer surface, flux emitting tip of the said transducer head being in contact with said magnetizable surface; sliding said holding member in the direction of the smaller diameter of said drum member to a position that establishes the required spacing between said flux emitting tip and said mangetizable surface, said spacing being commensurate to the amount of linear travel of said holding member; and securing said holding member in said position.

10. A method of establishing an air space gap between a transducer head magnetic flux emitting tip and a magnetizable record surface which is characterized by: supporting the magnetizable record surface on a cylindrical drum member; mounting said drum member rotatably within a coaxial stationary housing structure having an outer surface shaped as a frustum of a right circular cone; setting the transducer head in a holding member linearly slidable upon said outer surface, the flux emitting tip of said transducer head being in contact with said magnetizable surface; sliding said holding member in the direction of the greater outer diameter of said housing structure to a position that establishes the required spacing between said flux emitting tip and said magnetizable surface, said spacing being commensurate with to the amount of linear travel of said holding member; and securing said holding member in said position.

11. In a magnetic memory drum apparatus the combination of: a rotatable drum shape as a frustum of a right circular cone having a magnetizable layer on the peripheral surface thereof; a cylindrical stationary housing coaxial to the rotatable drum and surrounding said rotatable drum at least partially; at least one magnetic transducer head having a magnetic flux emitting tip proximate said magnetizable layer; means holding said magnetic transducer head on said stationary housing, said holding means being capable of limited linear motion along an imaginary line contained in an imaginary plane containing also the axis of said rotatable drum, whereby movement of said holding means in one direction increases the distance between the transducer head magnetic flux emitting tip and the magnetizable layer and movement in the opposite direction decreases said distance; and means locking said holding means securely in position once a predetermined such said distance has been established.

12. In a magnetic memory drum apparatus the combination of: a cylindrical rotatable drum having a magnetizable layer on the peripheral surface thereof; a stationary housing coaxial to the rotatable drum and surrounding said rotatable drum at least partially, said stationary housing having an outer surface shaped as a frustum of a right circular cone; at least one magnetic transducer head having a magnetic flux emitting tip proximate said magnetizable layer; means holding said magnetic transducer head from the outer surface of said stationary housing, said holding means being capable of limited linear motion along an imaginary line contained in an imaginary palne containing also the axis of said rotatable drum whereby movement of said holding means in one direction increases the distance between the transducer head magnetic flux emitting tip and the magnetizable layer and movement in the opposite direction decreases said distance; and means locking said holding means securely in position once a predetermined such said distance has been established.

References Cited by the Examiner

UNITED STATES PATENTS

| | | | |
|---|---|---|---|
| 2,827,355 | 3/58 | Lubkin et al. | 346—74 |
| 2,859,084 | 11/58 | Raddin | 346—74 |
| 2,864,892 | 12/58 | Perkins | 340—174.1 |
| 2,998,292 | 8/61 | Lubkin et al. | 346—74 |
| 3,001,181 | 9/61 | Taft | 346—74 |

IRVING L. SRAGOW, *Primary Examiner.*